(12) United States Patent
Bergman et al.

(10) Patent No.: US 11,568,160 B2
(45) Date of Patent: Jan. 31, 2023

(54) METHODS AND SYSTEMS FOR CLASSIFYING TAG STATUS IN A RETAIL ENVIRONMENT

(71) Applicant: Sensormatic Electronics, LLC, Boca Raton, FL (US)

(72) Inventors: Adam S. Bergman, Boca Raton, FL (US); Steve Edward Trivelpiece, Rancho Santa Margarita, CA (US); Eric F. Riggert, Trabuco Canyon, CA (US); Steven Raynesford, Mission Viejo, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 106 days.

(21) Appl. No.: 16/741,281

(22) Filed: Jan. 13, 2020

(65) Prior Publication Data
US 2021/0073491 A1 Mar. 11, 2021

Related U.S. Application Data

(60) Provisional application No. 62/897,051, filed on Sep. 6, 2019.

(51) Int. Cl.
*G06N 20/00* (2019.01)
*G06N 3/08* (2006.01)
(Continued)

(52) U.S. Cl.
CPC ......... *G06K 7/10425* (2013.01); *G06N 20/00* (2019.01); *G06Q 10/087* (2013.01); *G08B 13/2462* (2013.01)

(58) Field of Classification Search
CPC .................................................. G06K 7/10425
See application file for complete search history.

(56) References Cited

U.S. PATENT DOCUMENTS

| 10,140,486 B1 | 11/2018 | Lavery et al. |
| 2006/0033620 A1* | 2/2006 | Mathewson ........... G07G 1/009 340/572.1 |

(Continued)

OTHER PUBLICATIONS

International Search Report and Written Opinion issued in corresponding International Application No. PCT/US2020/049260 dated Dec. 14, 2020.

*Primary Examiner* — Joseph H Feild
*Assistant Examiner* — Pameshanand Mahase
(74) *Attorney, Agent, or Firm* — ArentFox Schiff LLP

(57) ABSTRACT

Examples described herein generally relate to a system for monitoring tags in a retail environment. The system includes an exit system including one or more sensors that read a tag to obtain exit system measurements associated with a tag detection event. The system includes a memory and a processor configured to execute instructions to receive a selection of a base configuration, the base configuration including weighting values for a plurality of exit system measurements. The processor may classify a tag detection event into a first tag status for the tag detection event based on application of the weighting values to exit system measurements associated with the tag detection event. The processor may determine a second tag status of the tag after the tag detection event. The processor may update the weighting values using a machine-learning algorithm based on at least the first tag status and the second tag status.

20 Claims, 5 Drawing Sheets

(51) Int. Cl.
*G06K 7/10* (2006.01)
*G08B 13/24* (2006.01)
*G06Q 10/08* (2012.01)

(56) References Cited

U.S. PATENT DOCUMENTS

| | | | | |
|---|---|---|---|---|
| 2010/0176947 | A1* | 7/2010 | Hall | G08B 13/248 |
| | | | | 340/572.1 |
| 2012/0307051 | A1 | 12/2012 | Welter | |
| 2013/0278425 | A1* | 10/2013 | Cunningham | G08B 13/242 |
| | | | | 340/572.1 |
| 2014/0026204 | A1* | 1/2014 | Buntinx | H04L 63/168 |
| | | | | 726/9 |
| 2016/0078264 | A1* | 3/2016 | Armstrong | G06K 7/10475 |
| | | | | 340/572.1 |
| 2016/0140820 | A1* | 5/2016 | Joseph | G08B 13/2417 |
| | | | | 340/572.1 |
| 2019/0361765 | A1* | 11/2019 | Alonso | G07F 17/32 |

* cited by examiner

METHODS AND SYSTEMS FOR CLASSIFYING TAG STATUS IN A RETAIL ENVIRONMENT

CLAIM OF PRIORITY UNDER 35 U.S.C. § 119

This application claims priority to U.S. Provisional Application No. 62/897,051 titled "METHODS AND SYSTEMS FOR CLASSIFYING TAG STATUS IN A RETAIL ENVIRONMENT," filed Sep. 6, 2019, which is assigned to the assignee hereof, and incorporated herein by reference in its entirety.

BACKGROUND

The present disclosure relates to monitoring retail locations, and more particularly to determining a status of a tag in a retail environment.

Retailers detect movement of goods using a security tag attached to the goods and sensors that detect the location of the security tag. A security system may include an exit system (e.g., a pedestal including a sensor) that detects the presence of a tag. The mere presence of the tag, however, may not provide enough information to determine a status of the tag. For example, generating an alarm in response to presence of a tag may generate a false alarm. Further, a security system may require a large exclusion zone, where unsold products are excluded, around the exit system to prevent false alarms.

Thus, there is a need in the art for improvements in determining a status of security tags. In particular, there is a need for systems and methods for classifying tag status.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In another aspect, the disclosure provides a system for monitoring tags in a retail environment. The system may include an exit system including one or more sensors that read a tag to obtain exit system measurements associated with a tag detection event. The system may include a memory storing computer executable instructions. The system may include a processor configured to execute the computer executable instructions. The processor may receive a selection of a base configuration, the base configuration including weighting values for a plurality of exit system measurements. The processor may classify, during operation of the exit system, a tag detection event into a first tag status for the tag detection event based on application of the weighting values to exit system measurements associated with the tag detection event. The processor may determine a second tag status of the tag after the tag detection event. The processor may update the weighting values using a machine-learning algorithm based on at least the first tag status and the second tag status.

In an example, the disclosure provides a method of monitoring tags in a retail environment. The method may include receiving a selection of a base configuration, the base configuration including weighting values for a plurality of exit system measurements. The method may include classifying, during operation of an exit system including one or more sensors, a tag detection event into a first tag status for the tag detection event based on application of the weighting values to exit system measurements associated with the tag detection event. The method may include determining a second tag status of the tag after the tag detection event. The method may include updating the weighting values using a machine-learning algorithm based on at least the first tag status and the second tag status.

In another aspect, the disclosure provides a non-transitory computer readable medium storing computer executable instructions that may be executed by a processor to classify a tag detection event in a retail environment. The non-transitory computer readable medium may include instructions to receive a selection of a base configuration, the base configuration including weighting values for a plurality of exit system measurements. The non-transitory computer readable medium may include instructions to classify, during operation of an exit system including two or more sensors, a tag detection event into a first tag status for the tag detection event based on application of the weighting values to exit system measurements associated with the tag detection event. The non-transitory computer readable medium may include instructions to determine a second tag status of the tag after the tag detection event. The non-transitory computer readable medium may include instructions to update the weighting values using a machine-learning algorithm based on at least the first tag status and the second tag status.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for classifying a tag status in a retail environment. The disclosure provides a system that automatically adapts classification weighting factors to improve classification of tag events in the retail environment.

Current techniques for classifying tag events involve configuration by engineers based on a particular deployment of a security system in a retail environment. For example, the engineers may configure the security system with algorithms for detecting events such as a tag leaving the retail environment. The engineers may test the system by moving tags within the detection field of the security system, observe measurements of the tags, and adjust parameters of the algorithms to identify tags leaving the retail location and to avoid false alarms. Such current techniques are labor intensive and rely on skilled engineers to configure the security system. Further, the layout of the retail location may change, sometimes frequently, thereby affecting the configured security system and requiring manual reconfiguration.

In an example, the present disclosure provides a security system and methods for configuring the security system to classify tag detection events into a tag status. The security system may be configured with one or more base configurations, each of which may be a trained classification model (e.g., a machine-learning classifier) based on a sample layout that is similar to the retail location. A sample layout may include parameters of the security system such as a number and size of exits, number of sensors, location and orientation of sensors, and distances to displays of merchandise. In an implementation, the security system may receive a selection of the base configuration or sample layout from an operator, who need not be an engineer, based on a comparison of the retail location to sample layouts. In another implementation, the base configuration may be manually configured. In another implementation, the security system may determine the base configuration automatically based on measurements by the sensors in the security system. The security system may operate using the base configuration to classify tag detection events. That is, the security system may detect tags within a field of the sensors and determine a status of each tag based on measurements using the base configuration. The tag status may be used to determine an inventory change event and/or a loss event. In an aspect, the system may determine a second tag status that may be more accurate than the first tag status. For example, the security system may detect the second tag status based on point of sale (POS) system transactions, periodic inventory procedures, video systems, or manual detection by employees. The security system may update the base configuration using a machine-learning algorithm based on at least the first tag status and the second tag status.

Figure 1:
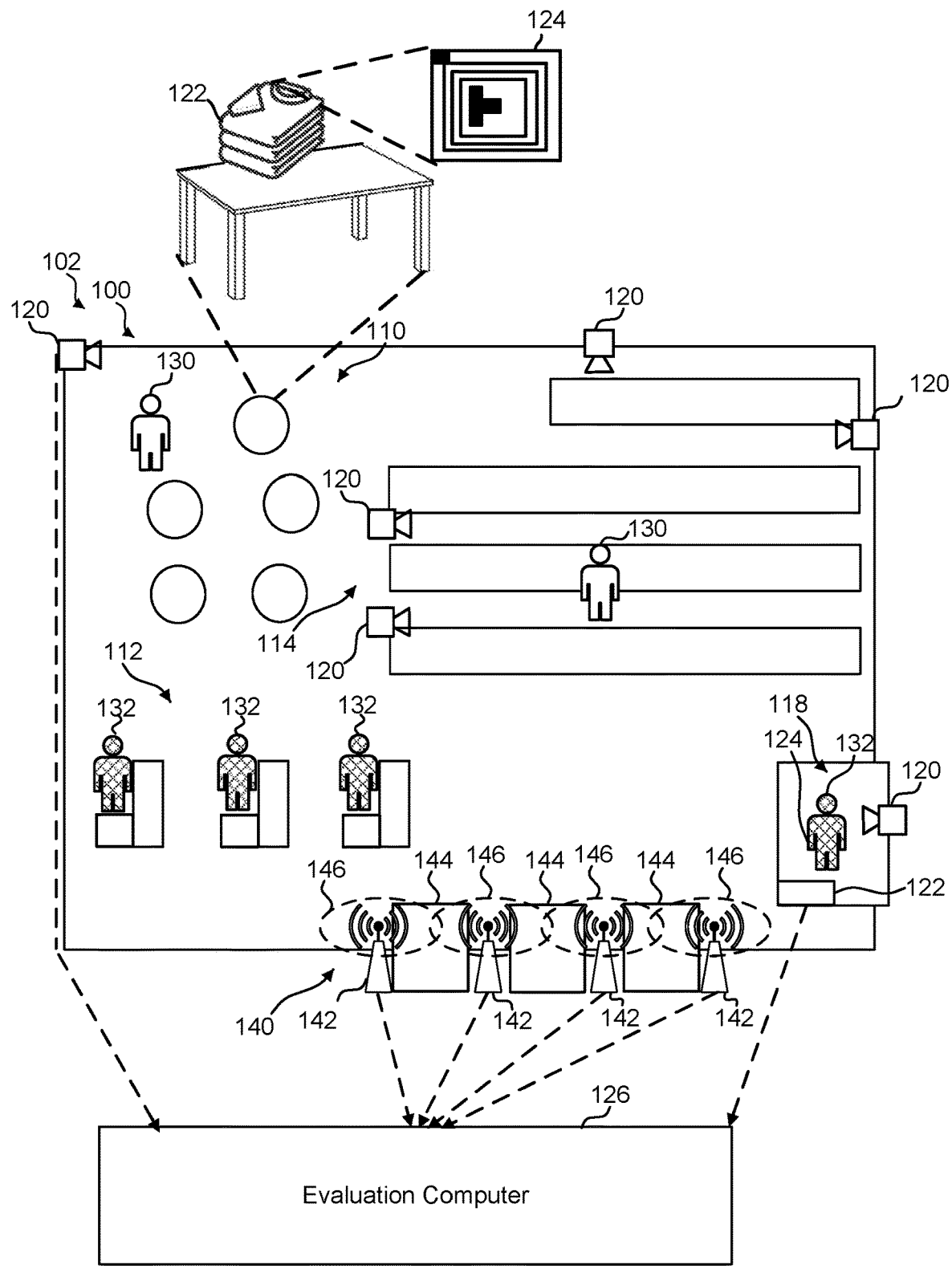
FIG. 1 is a schematic diagram of an example retail location including a first example of a security system.

Referring now to FIG. 1, an example retail location 100 includes multiple regions where tagged products may be located. For example, the retail location 100 may include an open display area 110, a front end 112, aisles 114, and a security room 118. Customers 130 may be located within the different regions. Workers 132 may be stationed at locations such as check out registers and the security room 118. A person of skill in the art would understand that the disclosed systems and methods are applicable to a variety of retail locations and the present disclosure is not limited to the example retail location or areas.

As discussed above, retailers (e.g., apparel retailers) have deployed security tags such as radio frequency identification (RFID) systems in stores to track product movements as they arrive at stores, are placed on display on the sales floor, and are sold. By adopting RFID, retailers are able to reduce the amount of time that the store employees spend counting the inventory (e.g., manually counting inventor that is on the floor and in stock room), as well as increase merchandise visibility within each store, thereby enabling shoppers in the store and online to find what they seek. RFID uses radio waves to read and capture information stored on a tag attached to an object such as a good, product, or merchandise. Additionally, RFID tags may be used with a security system to detect inventory changes and possible loss events. For example, RFID tags may be read by an exit system to determine whether a tagged item 122 is leaving the retail location. A tag (e.g., tag 124) can be read from up to several feet away and does not need to be within direct line-of-sight of the reader to be tracked. Although the present disclosure refers to RFID tags, the techniques disclosed herein may be applicable to other types of security tags (e.g., electronic article surveillance (EAS) tags).

An RFID system may be made up of two parts: a tag or label (e.g., EPC tag 124) and a reader (e.g., exit system 140). RFID tags (which may also be referred to as labels) are embedded with an RFID transmitter and a receiver. The RFID component on the tags may include a microchip that stores and processes information, and an antenna to receive and transmit signals. The EPC tag may further contain the specific serial number for each specific object (e.g., an electronic product code (EPC)). For example, in one implementation, an EPC tag may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on an EPC tag 124, a two-way radio transmitter-receiver called an interrogator or reader (e.g., exit system 140) emits a signal to the EPC tag using the antenna (e.g., internal antennas). The exit system 140 may apply filtering to indicate what memory bank the EPC tag 124 should use to respond to the emitted signal. The EPC tag 124 may respond with the information (e.g., EPC value or serial number) written in the memory bank. The EPC tag data set may include any information stored on the EPC tag 124 as well as information about reading the EPC tag 124. For example, the EPC tag data set may include: a timestamp, a location, a signal transmission power, a received signal strength indication (RSSI), and an identifier of the RFID reader (e.g., exit system 140). For purposes of this disclosure, the terms, the EPC tag and RFID tag may be used interchangeably. The EPC tag 124 may be a passive tag or a battery powered EPC tag. A passive RFID tag may use the RFIC interrogator or receiver's 140 radio wave energy to relay the stored information back to the interrogator. In contrast, a battery powered EPC tag 124 may be embedded with a small battery that powers the relay of information.

The security system 102 may include an exit system 140, multiple cameras 120, and an evaluation computer 126. The exit system 140 may include multiple sensors 142 located near exits 144. For example, the example retail location 100 may include three exits 144 that are relatively narrow. The sensors 142 may be located on each side of the exits 144. For example, in an implementation, the sensors 142 may include at least one RFID reader including an antenna that generates a tag detection field 146. Generally, the sensors 142 may be configured (e.g., by setting a power level) such that the tag detection fields 146 cover the exits 144 to detect tags moving through the exits. Although the sensors 142 are illustrated as pedestals adjacent the exits 144, sensors 142 may be located on the floor and/or the ceiling. The sensors 142 may include additional sensors that may produce measurements other than RF measurements. For example, the sensors 142 may include infrared (IR) sensors, inertial sensors, magnetic sensors, or cameras. An exclusion area may be defined near the exit system 140. Tagged products may generally be excluded from the exclusion area to prevent reading by the exit system 140.

The cameras 120 may be located in or near the exit system 140 or may be located in other regions of retail location 100.

Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the security system 102 may move a camera 120 to maintain the field of view of the camera 120 on a customer 130. In another aspect, the security system 102 may allow manual control over one or more cameras 120. In an aspect, the security system 102 may be integrated with one or more other systems, and the video feed of the cameras 120 may be used for multiple purposes.

The evaluation computer 126 may be a computer device programmed to evaluate at least exit system measurements from the sensors 142. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing exist system measurements.

Figure 2:
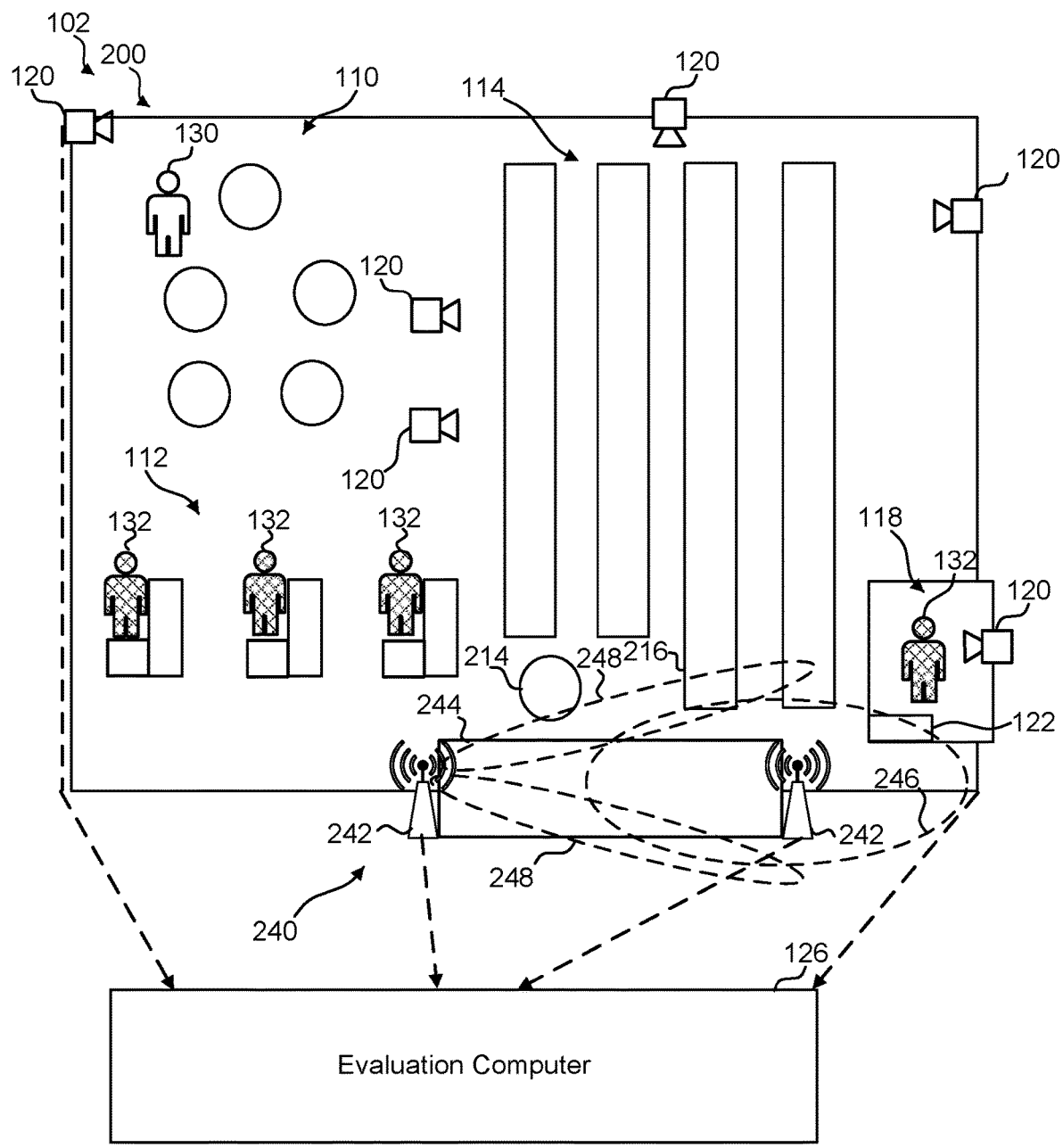
FIG. 2 is a schematic diagram of an example retail location including a second example of a security system.

Turning to FIG. 2, a second example retail location 200 may include similar features to the first example retail location 100, but arranged in a different layout. For instance, the second example retail location 200 may be the same physical location as the first example retail location 100 with features rearranged, or a separate physical location. The second example retail location 200 may have a single, relatively large exit 244 compared to the first example retail location 100. In order to cover the exit 244, the sensors 242 of the exit system 240 may, for example, have greater power than the sensors 142 to generate a tag detection field 246. As another example, the sensors 242 may generate beams 248 that are directional tag detection fields. The exit system 140 may be configured by an operator with desired tag detection fields. In another aspect, the exit system 140 may automatically configure itself, for example, by having each sensor detect a distance to the other sensors and controlling a transmit power to generate a tag detection field that covers an area between sensors.

The second example retail location 200 may have a smaller exclusion area around the exit 244 and/or have larger tag detection fields 246, compared to the first example retail location. For example, the retail operator may want to place tagged products on display within the tag detection field 246. In an aspect, detected tags within the tag detection field 246 or beams 248 may indicate a different scenario than detected tags within the tag detection fields 146. For example, tagged merchandise may be placed on a display 214 or a shelf 216 that is near the exit 244. The tag detection field 246 and/or the beam 248 may read such tags even when the merchandise is stationary on the display 214 or shelf 216. Additionally, the tag detection field may cover an area that is outside of the retail location. For instance, a beam may point into a common area of a shopping mall outside of the retail location. The tag detection field may also extend into a portion of an adjacent retail location and detect tags of the adjacent retail location.

In an aspect, for the security system 102 may classify tag detection events to determine a status of the tag. For example, the security system 102 may classify a tag detection event for a tag on the display 214 as a stationary or in location status. The security system 102 may also classify a tag detection event as an out of location tag status for tags that are outside of the retail location. As another example, a tag that is moving within the store but does not pass through an exit may be classified as a parallel status. Generally, such a statuses may not indicate an inventory change event (e.g., the merchandise is not leaving or entering the retail location). Similarly, such a status may not indicate a theft, and the security system 102 may not generate a loss prevention output (e.g., alarm or message) based on the tag detection event. Accordingly, the security system 102 may avoid false alarms.

Figure 3:
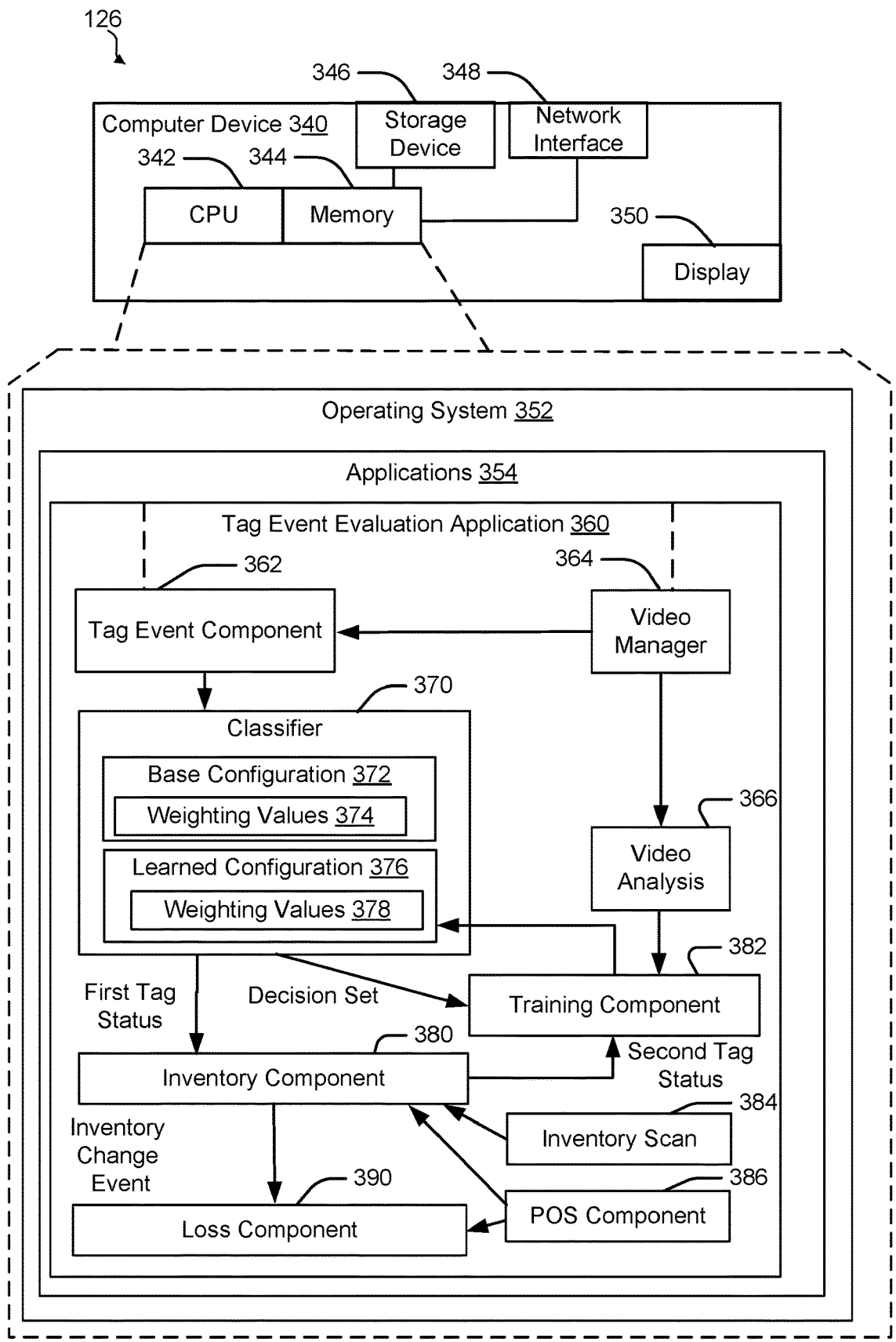
FIG. 3 is a diagram of an example computer system implementing a security system including a tag event evaluation application.

Turning to FIG. 3, an example computer device 340 may be used to implement the evaluation computer 126. The computer device 340 may include a central processing unit (CPU) 342 that executes instructions stored in memory 344. For example, the CPU 342 may execute an operating system 352 and one or more applications 354, which may include a tag event evaluation application 360. The computer device 340 may include a storage device 346 for storing data (e.g., exit system measurements and video data streams). The computer device 340 may also include a network interface 348 for communication with external devices via a network. For example, the computer device 340 may communicate with the cameras 120.

The computer device 340 may include a display 350. The display 350 may be, for example, a computer monitor and/or a touch-screen. The display 350 may provide information to an operator and allow the operator to configure the computer device 340.

Memory 344 may be configured for storing data and/or computer-executable instructions defining and/or associated with an operating system 352 and/or application 354, and CPU 342 may execute operating system 352 and/or application 354. Memory 344 may represent one or more hardware memory devices accessible to computer device 340. An example of memory 344 can include, but is not limited to, a type of memory usable by a computer, such as random access memory (RAM), read only memory (ROM), tapes, magnetic discs, optical discs, volatile memory, non-volatile memory, and any combination thereof. Memory 344 may store local versions of applications being executed by CPU 342. In an implementation, the memory 344 may include a storage device, which may be a non-volatile memory.

The CPU 342 may include one or more processors for executing instructions. An example of CPU 342 can include, but is not limited to, any processor specially programmed as described herein, including a controller, microcontroller, application specific integrated circuit (ASIC), field programmable gate array (FPGA), system on chip (SoC), or other programmable logic or state machine. The CPU 342 may include other processing components such as an arithmetic logic unit (ALU), registers, and a control unit. The CPU 342 may include multiple cores and may be able to process different sets of instructions and/or data concurrently using the multiple cores to execute multiple threads.

The operating system 352 may include instructions (such as applications 330) stored in memory 344 and executable by the CPU 342. The applications 354 may include a tag event evaluation application 360 configured to classify a tag detection event into a first tag status for the tag detection event based on application of weighting values to exit system measurements. In an aspect, the tag event evaluation application 360 may determine a second tag status of the tag after the tag detection event. For example, the tag event evaluation application may determine the second tag status based on a different input such as a point of sale (POS) system transaction, an inventory scan, video analysis, or manual entry. Additionally, the tag event evaluation application 360 may update weighting values using a machine-learning algorithm based on at least the first tag status and the second tag status.

The tag event evaluation application 360 may include a tag event component 362 that determines tag events detected at the exit system 140. The tag event component 362 may determine exit system measurements for the tag detection event. For example, the exit system measurements may include one or more properties read from a tag. The exit system measurements may include any information stored on the EPC tag 124 as well as information about reading the EPC tag 124. For example, the EPC tag data set may include: a timestamp, a location, a signal transmission power, a received signal strength indication (RSSI), a phase angle of the tag, and an identifier of the sensor 142. The exit system 140 may determine additional information that may be correlated with the EPC tag data and/or derived from multiple tag reads or other sensors. For instance, the cameras 120 may provide a video feed to a video manager 364 that counts people in the video and provides locations of tracked people. The additional information may be included in the exit system measurements. For example, the exit system measurements may include a number of tags read over time; the RSSI of the tag; a change in RSSI over time, frequency, or beam; a phase angle of the tag; a speed of the tag; a number of people between sensors of the exit system 140; a number of people in an exit area; a location history of a person associated with the tag; a duration of the tag being read; and a stock keeping unit (SKU) of the tag being read. The tag event component 362 may provide a tag event data set to the classifier 370 to classify the tag event into a tag status.

The classifier 370 may be a machine-learning classifier trained to classify the tag event data set to a tag status. The classifier 370 may be configured with a base configuration 372 including weighting values 374. The weighting values 374 may be different weights for respective elements of the tag event data set or weights of various nodes within a classifier (e.g., a support vector machine (SVM) or digital neural network (DNN)). In an aspect, the base configuration 372 may be configured based on a sample layout and an associated set of weighting values 374. For instance, multiple base configurations 372 may be developed based on testing of existing systems or laboratory tests. An operator or the security system 102 may select a sample layout that most closely resembles a retail location (e.g., example retail location 100 or example retail location 200), and the tag event evaluation application 360 may configure the classifier 370 with the weighting values 374 associated with the selected sample layout. In an aspect, the base configuration and/or weighting values may be referred to as a classifier or machine-learning model.

The classifier 370 may determine a tag status based on the tag event data set and the weighting values 374. The tag status may be selected from a set of labels used to train the base configuration 372, for example, using a supervised learning algorithm. In an aspect, example tag statuses may include one or more of: stationary, in location, out of location, grouped, entering location, exiting location, parallel movement, or partial transition. The classifier 370 may determine a probability or certainty of the tag event data set matching each of the tag statuses. In an aspect, the classifier 370 may select a highest probability/certainty status, or select one or more statuses where the probability/certainty satisfies a threshold. Accordingly, two or more statuses may be applicable to a particular tag detection event. A stationary status may refer to a state in which the tag is not moving. An in location status may refer to a state in which the tag is located within the retail location. An out of location status may refer to a state in which the tag is located outside of the retail location. A grouped status may refer to a state in which the tag is co-located with a group of tags. An entering location status may refer to a state in which the tag is moving into the retail location. For instance, an entering location status may correspond to a customer returning a tagged item. An exiting location status may refer to a state in which the tag is moving out of the retail location. A parallel movement status may refer to a state in which the tag is moving parallel or near parallel to the exit system 140. A partial transition status may refer to a state in which the tag is moving within a tag detection field 146, 246 and changes direction.

The classifier 370 may include a learned configuration 376. As discussed above, the detection of tags by an exit system 140 may vary based on the arrangement of the exit system 140 and the retail location 100, 200. The learned configuration 376 may be similar to the base configuration 372 and include a set of weighting values 378. The learned configuration 376, however, may be trained based on evaluation of the first tag status generated by the classifier 370 and a second tag status determined via a second method. Since the learned configuration 376 is specific to the retail location, the classifier 370 may more accurately classify tag detection events using the learned configuration 376.

The tag event evaluation application 360 may include an inventory component 380 that determines whether the first tag status indicates a change in inventory. The inventory component 380 may operate in real-time or near real-time (e.g., on the order of seconds) to determine inventory change events as they occur. That is, the inventory component 380 may determine when tagged items are entering or leaving the retail location. In an aspect, the inventory component 380 may determine an inventory change event based on the tag status. For example, the exiting location status may indicate an inventory change event for the tagged item.

The inventory component 380 may also determine a second tag status of a tag. For example, the inventory component 380 may receive input from an inventory scan 384. The inventory scan 384 may include results from a mobile scanner used to scan in-store inventory or fixed scanners covering a retail location 100, 200. The inventory scan 384 may be conducted periodically (e.g., nightly or hourly). In another example, the inventory component 380 may receive inventory information from a POS component 386 that records POS transactions (e.g., purchases of items). The inventory component 380 may match the POS transactions to tags to determine whether the item associated with a tag has been sold, which should correspond to an exiting status or an out location status.

The tag event evaluation application 360 may include a loss component 390 that determines whether an inventory change event indicates a loss event. In an aspect, the loss component 390 may optionally receive input from the POS component 386. The loss component 390 may compare inventory change events to POS transactions to determine whether an inventory change event corresponds to a purchased item, or a loss (e.g., theft of an unpurchased item). The loss component 390 may generate a loss event output such as an alarm and/or a message to security personnel. The message may include any known information about the loss event including, for example, the tag EPC, the corresponding product, pictures, or video of the exit during the tag detection event.

The tag event evaluation application 360 may include a training component 382 that trained the learned configuration 376 based on the first tag status and the second tag status. The training component 382 may also receive a decision set that may be record of a tag detection event. The record of the tag detection event may include an EPC of the tag, the plurality of exit system measurements, a time of the tag detection event, and the first tag status. The training component 382 may utilize one or more machine-learning algorithms to train the learned configuration 376. In a first example, the training component 382 may utilize supervised learning by generating a training set based on the received decision sets. The training component 382 may label the decision sets with the second tag status to generate a training sample. In an aspect, the training component 382 may adjust a weight of training samples based on whether the first tag status and the second tag status are conflicting. In a second example, the training component 382 may utilize reinforcement learning to generate the learned configuration 376 based on the base configuration 372. A reward function may be incremented when the first tag status is correct based on the second tag status or decremented when the classifier when the first tag status is incorrect based on the second tag status. The training component 382 may adjust the weighting values 378 to maximize the reward function.

Figure 4:
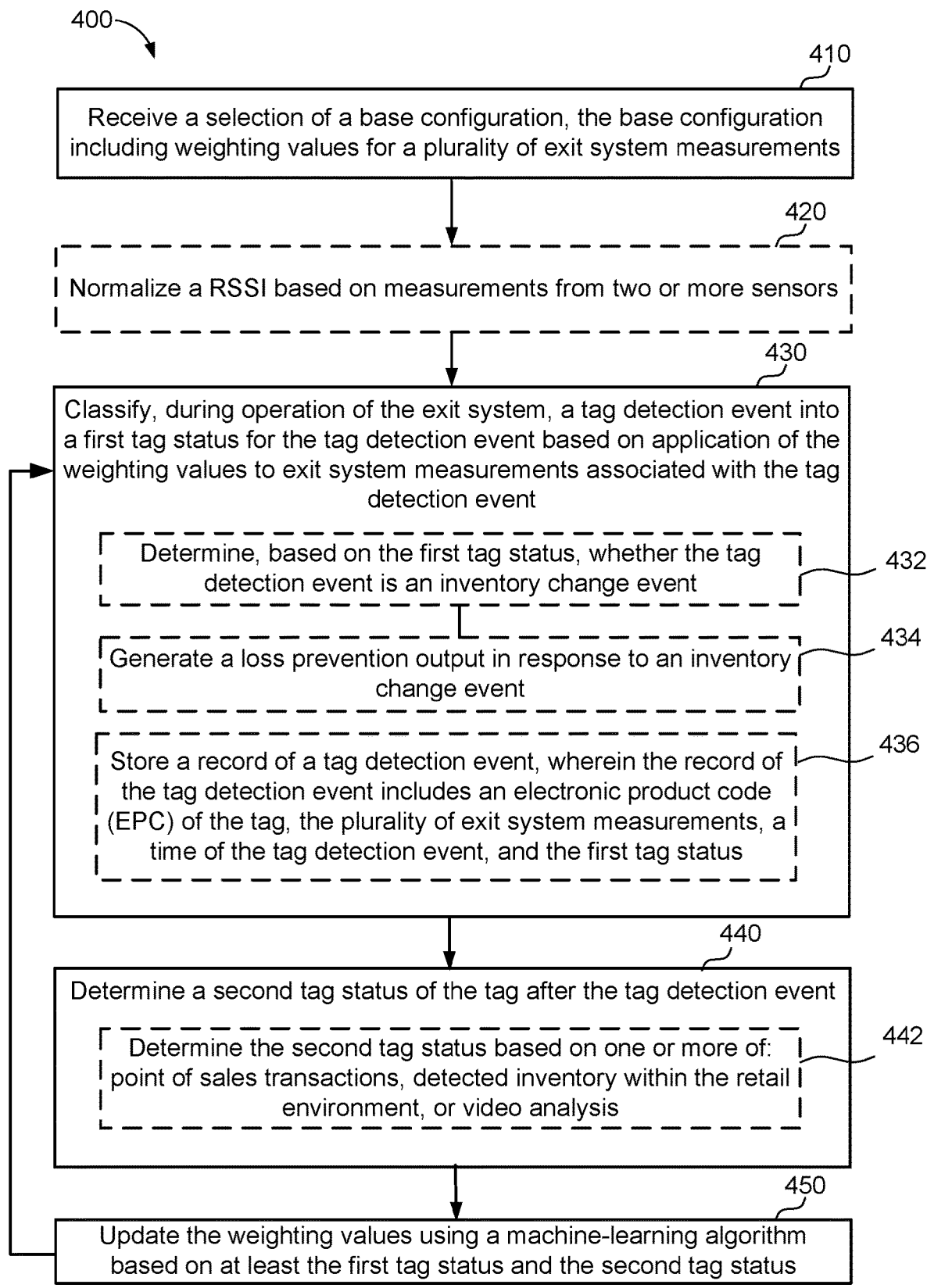
FIG. 4 is a flowchart of an example method of classifying a tag status, in accordance with an implementation of the present disclosure.

Turning to FIG. 4, an example method 400 determines a tag status for an RFID tag. For example, method 400 may be performed by the tag event evaluation application 360 on the computer device 340. Optional blocks are shown with dashed lines.

At block 410, the method 400 may include receiving a selection of a base configuration, the base configuration including weighting values for a plurality of exit system measurements. In an aspect, for example, the classifier 370 may receive the selection of the base configuration 372, the base configuration 372 including weighting values 374 for a plurality of exit system measurements.

At block 420, the method 400 may optionally include normalizing an RSSI based on measurements from two or more sensors. In an aspect, for example, the tag event component 362 may control the sensors 142 of the exit system 140 to normalize the RSSI for a tag based on measurements from two or more of the sensors 142.

At block 430, the method 400 may include classifying, during operation of the exit system, a tag detection event into a first tag status for the tag detection event based on application of the weighting values to exit system measurements associated with the tag detection event. In an aspect, for example, the classifier 370 may classify, during operation of the exit system 140, a tag detection event into a first tag status for the tag detection event based on application of the weighting values 374 to exit system measurements associated with the tag detection event.

At sub-block 432, the block 430 may optionally include determining, based on the first tag status, whether the tag detection event is an inventory change event. In an aspect, for example, the inventory component 380 may determine, based on the first tag status, whether the tag detection event is an inventory change event.

At sub-block 434, the block 430 may optionally include generating a loss prevention output in response to an inventory change event. For example, the loss component 390 may generate the loss prevention output in response to an inventory change event.

At sub-block 436, the block 430 may optionally include storing a record of a tag detection event, wherein the record of the tag detection event includes an EPC of the tag, the plurality of exit system measurements, a time of the tag detection event, and the first tag status. In an aspect, for example, the classifier 370 may store the record of the tag detection event (e.g., as a decision set).

At block 440, the method 400 may include determining a second tag status of the tag after the tag detection event. In an aspect, for example, the inventory component 380 may determine the second tag status of the tag after the tag detection event.

At sub-block 442, the block 440 may optionally include determining the second tag status based on one or more of: point of sales transactions, detected inventory within the retail environment, or video analysis. In an aspect, for example, the inventory component 380 may determine the second tag status based on one or more of: point of sales transactions (e.g., from POS component 386), detected inventory within the retail environment (e.g., from inventory scan 384), or video analysis (e.g., from video analysis 366).

At block 450, the method 400 may include updating the weighting values using a machine-learning algorithm based on at least the first tag status and the second tag status. In an aspect, for example, the training component 382 may update the weighting values 378 using a machine-learning algorithm based on at least the first tag status and the second tag status. The method 400 may return to block 430 to classify additional tag events using the weighting values 378.

Figure 5:
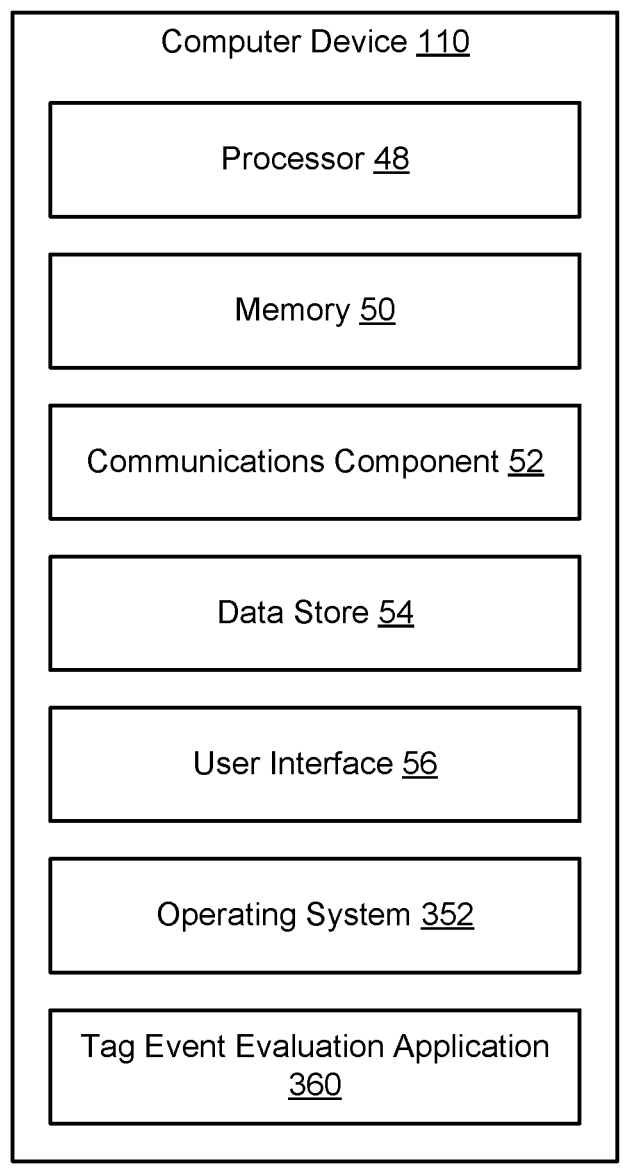
FIG. 5 is a schematic block diagram of an example computer device, in accordance with an implementation of the present disclosure.

Referring now to FIG. 5, illustrated is an example computer device 340 in accordance with an implementation, including additional component details as compared to FIG. 3. In one example, computer device 340 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 342.

In an example, computer device 340 may include memory 50 for storing instructions executable by the processor 48 for carrying out the functions described herein. In an implementation, for example, memory 50 may include memory 344. The memory 50 may include instructions for executing the tag event evaluation application 360.

Further, computer device 340 may include a communications component 52 that provides for establishing and maintaining communications with one or more parties utilizing hardware, software, and services as described herein. Communications component 52 may carry communications between components on computer device 340, as well as between computer device 340 and external devices, such as devices located across a communications network and/or devices serially or locally connected to computer device 340. For example, communications component 52 may include one or more buses, and may further include transmit chain components and receive chain components associated with a transmitter and receiver, respectively, operable for interfacing with external devices.

Additionally, computer device 340 may include a data store 54, which can be any suitable combination of hardware and/or software, that provides for mass storage of information, databases, and programs employed in connection with implementations described herein. For example, data store 54 may be a data repository for operating system 352 and/or applications 354. The data store may include memory 344 and/or storage device 346.

Computer device 340 may also include a user interface component 56 operable to receive inputs from a user of computer device 340 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 352 and/or applications 354. In addition, processor 48 may execute operating system 352 and/or applications 354, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A system for monitoring tags in a retail environment, comprising:
an exit system including one or more sensors that read a tag to obtain exit system measurements associated with a tag detection event;
a memory storing computer executable instructions; and
a processor configured to execute the computer executable instructions to:
receive a selection of a base configuration, the base configuration including weighting values for a plurality of exit system measurements, wherein the weighting values are weights for respective elements of a tag event data set or weights of nodes within a classifier;
classify, during operation of the exit system, a tag detection event into a first tag status for the tag detection event based on application of the weighting values to exit system measurements associated with the tag detection event;
determine a second tag status of the tag after the tag detection event; and
update the weighting values using a machine-learning algorithm based on at least the first tag status and the second tag status.

2. The system of claim 1, wherein the processor is configured to determine, based on the first tag status, whether the tag detection event is an inventory change event.

3. The system of claim 2, wherein the processor is configured to generate a loss prevention output in response to an inventory change event.

4. The system of claim 1, wherein the weighting values for the plurality exit system measurements include weighting values for two or more of: a number of tags read over time; a received signal strength indication (RSSI) of a tag; a change in RSSI over time, frequency, or beam; a phase angle of the tag; a speed of the tag; a number of people between sensors of the exit system; a number of people in an exit area; a location history of a person associated with the tag; a duration of the tag being read; and a similarity between a stock keeping unit (SKU) of the tag being read and SKUs on display near an exit.

5. The system of claim 1, wherein the first tag status is one or more of: stationary, in location, out of location, grouped, entering location, exiting location, parallel movement, or partial transition.

6. The system of claim 1, wherein to determine the second tag status of the tag, the processor is configured to determine the second tag status based on one or more of: point of sales transactions, detected inventory within the retail environment, or video analysis.

7. The system of claim 1, wherein the processor is configured to store a record of a tag detection event, wherein the record of the tag detection event includes an electronic product code (EPC) of the tag, the plurality of exit system measurements, a time of the tag detection event, and the first tag status.

8. The system of claim 1, wherein the processor is configured to normalize a received signal strength indication (RSSI) based on measurements from two or more sensors.

9. The system of claim 1, wherein the machine learning algorithm is one of a supervised learning algorithm or a reinforcement learning algorithm.

10. A method of monitoring tags in a retail environment, comprising:
receiving a selection of a base configuration, the base configuration including weighting values for a plurality of exit system measurements wherein the weighting values are weights for respective elements of a tag event data set or weights of nodes within a classifier;
classifying, during operation of an exit system including one or more sensors, a tag detection event into a first tag status for the tag detection event based on application of the weighting values to exit system measurements associated with the tag detection event;
determining a second tag status of the tag after the tag detection event; and
updating the weighting values using a machine-learning algorithm based on at least the first tag status and the second tag status.

11. The method of claim 10, further comprising determining, based on the first tag status, whether the tag detection event is an inventory change event.

12. The method of claim 11, further comprising generating a loss prevention output in response to an inventory change event.

13. The method of claim 10, wherein the weighting values for the plurality exit system measurements include weighting values for two or more of: a number of tags read over time; a received signal strength indication (RSSI) of a tag; a change in RSSI over time, frequency, or beam; a phase angle of the tag; a speed of the tag; a number of people between sensors of the exit system; a number of people in an exit area; a location history of a person associated with the tag; a duration of the tag being read; and a similarity between a stock keeping unit (SKU) of the tag being read and SKUs on display near an exit.

14. The method of claim 10, wherein the first tag status is one or more of: stationary, in location, out of location, grouped, entering location, exiting location, parallel movement, or partial transition.

15. The method of claim 10, wherein to determining the second tag status of the comprises determining the second tag status based on one or more of: point of sales transactions, detected inventory within the retail environment, or video analysis.

16. The method of claim 10, further comprising storing a record of a tag detection event, wherein the record of the tag detection event includes an electronic product code (EPC) of the tag, the plurality of exit system measurements, a time of the tag detection event, and the first tag status.

17. The method of claim 10, further comprising normalizing a received signal strength indication (RSSI) based on measurements from two or more sensors.

18. The method of claim 10, wherein the machine learning algorithm is one of a supervised learning algorithm or a reinforcement learning algorithm.

19. A non-transitory computer readable medium storing computer executable instructions that when executed by a processor cause the processor to:
receive a selection of a base configuration, the base configuration including weighting values for a plurality of exit system measurements wherein the weighting values are weights for respective elements of a tag event data set or weights of nodes within a classifier;
classify, during operation of an exit system including two or more sensors, a tag detection event into a first tag status for the tag detection event based on application of the weighting values to exit system measurements associated with the tag detection event;
determine a second tag status of the tag after the tag detection event; and update the weighting values using a machine-learning algorithm based on at least the first tag status and the second tag status.

20. The non-transitory computer readable medium of claim 19, further comprising instructions to:
determine, based on the first tag status, whether the tag detection event is an inventory change event; and
generate a loss prevention output in response to an inventory change event.

\* \* \* \* \*